United States Patent
Turin et al.

(10) Patent No.: US 11,544,139 B1
(45) Date of Patent: Jan. 3, 2023

(54) RESOLVING ERRED 10 FLOWS

(71) Applicant: VAST DATA LTD., Tel Aviv (IL)

(72) Inventors: Alex Turin, Tel Aviv (IL); Yuval Mintz, Tel Aviv (IL); Alon Horev, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 17/538,970

(22) Filed: Nov. 30, 2021

(51) Int. Cl.
*G06F 11/00* (2006.01)
*G06F 11/07* (2006.01)
*G06F 13/28* (2006.01)
*G06F 13/16* (2006.01)
*G06F 11/14* (2006.01)

(52) U.S. Cl.
CPC ...... *G06F 11/0793* (2013.01); *G06F 11/0745* (2013.01); *G06F 11/0751* (2013.01); *G06F 11/1423* (2013.01); *G06F 13/1668* (2013.01); *G06F 13/28* (2013.01)

(58) Field of Classification Search
CPC ............. G06F 11/0703; G06F 11/0706; G06F 11/0745; G06F 11/0751; G06F 11/0766; G06F 11/0793; G06F 11/1415; G06F 11/142; G06F 11/1423; G06F 13/14; G06F 13/16; G06F 13/1668; G06F 13/28; H04L 41/0654; H04L 41/0659; H04L 41/0677
See application file for complete search history.

(56) References Cited

U.S. PATENT DOCUMENTS

| | | | | |
|---|---|---|---|---|
| 5,325,517 A | * | 6/1994 | Baker ................. | G06F 11/1641 714/E11.015 |
| 6,145,028 A | * | 11/2000 | Shank .................. | G06F 13/102 710/316 |
| 7,013,379 B1 | * | 3/2006 | Testardi ............... | G06F 3/0613 711/E12.067 |
| 7,600,083 B2 | * | 10/2009 | Aggarwal ............ | G06F 3/0683 714/6.32 |
| 7,761,677 B2 | * | 7/2010 | Arakawa ............. | G06F 3/067 711/114 |
| 2006/0112251 A1 | * | 5/2006 | Karr ..................... | G06F 3/061 711/170 |

FOREIGN PATENT DOCUMENTS

WO WO-2021027481 A1 * 2/2021 ......... H04L 41/0654

* cited by examiner

*Primary Examiner* — Anthony J Amoroso
(74) *Attorney, Agent, or Firm* — Reches Patents

(57) ABSTRACT

A method for resolving an erred input/output (IO) flow, the method may include (i) sending over a path a remote direct write request associated with a certain address range; wherein the path is formed between a compute node of a storage system to a storage drive of the storage system; (ii) receiving by the compute node an error message related to the remote direct write request; wherein the error message does not indicate whether an execution of the remote direct write request failed or is only temporarily delayed; (iii) responding by the compute node to the error message by (a) preventing from sending one or more IO requests through the path, (b) preventing from sending at least one IO requests aimed to the certain address range; and (c) requesting, using a management communication link, to force an execution of pending IO requests that are related to the path; and (iv) reuse the path, by the compute node, following an indication that there are no pending IO requests that are related to the path.

25 Claims, 3 Drawing Sheets

RESOLVING ERRED IO FLOWS

TECHNICAL FIELD

The present disclosure generally relates to the field of data storage, and more particularly to resolving erred IO (Input/Output) flows.

BACKGROUND

NVMe (Non-Volatile Memory Express) protocol is employed for accessing non-volatile storage media (SSDs—Solid State Drives, NVRAM—Non-Volatile Random Access Memory) attached via a PCI Express (PCIe—Peripheral Component Interconnect Express) bus. NVMe commands can be transported over a fabric (cloud) that provides distance connectivity to NVMe devices, using Fibre Channel or RDMA over InfiniB and, Ethernet, Converged Ethernet (known as RoCE—RDMA over Converged Ethernet). NVMe over fabric enables one computer (host) to access, over longer distances, NVM devices that are attached via PCI to another computer (target).

A host may access PCI NVM drives (also known as subsystems), that are accessible to the host over multiple paths, connecting the host to the target via the fabric.

To support parallel operation to the same drive, the NVMe standard supports up to 64K command queues within an I/O Queue, where each command queue is associated with one host accessing the device via a certain path.

Accessing the same device via multiple paths can cause race conditions that in certain circumstances may cause data corruption.

SUMMARY

There may be provide a storage system, a method and a non-transitory computer readable medium for resolving erred IO (Input/Output) flows.

There may be provided a method for resolving an erred input/output (IO) flow, the method may include sending over a path a remote direct write request associated with a certain address range; wherein the path is formed between a compute node of a storage system to a storage drive of the storage system; receiving by the compute node an error message related to the remote direct write request; wherein the error message does not indicate whether an execution of the remote direct write request failed or is only temporarily delayed; responding by the compute node to the error message by (a) preventing from sending one or more IO requests through the path, (b) preventing from sending at least one IO requests associated with the certain address range; and (c) requesting, using a management communication link, to force an execution of pending IO requests that are related to the path; and reusing the path, by the compute node, following an indication that there are no pending IO requests that are related to the path.

There may be provided at least one non-transitory computer readable medium that stores instructions for: sending over a path a remote direct write request associated with a certain address range; wherein the path is formed between a compute node of a storage system to a storage drive of the storage system; receiving by the compute node an error message related to the remote direct write request; wherein the error message does not indicate whether an execution of the remote direct write request failed or is only temporarily delayed; responding by the compute node to the error message by (a) preventing from sending one or more IO requests through the path, (b) preventing from sending at least one IO requests associated with the certain address range; and (c) requesting, using a management communication link, to force an execution of pending IO requests that are related to the path; and reusing the path, by the compute node, following an indication that there are no pending IO requests that are related to the path.

The at least one non-transitory computer readable medium may include a non-transitory computer readable medium that stores instructions executed by a compute node and another non-transitory computer readable medium that stores instructions executed by an entity that differs from the compute node—for example by a storage node and/or a storage drive.

There may be provided a storage system that may include a compute node and a storage drive; wherein the compute node is configured to: send over a path a remote direct write request associated with a certain address range; wherein the path is formed between the compute node to the storage drive; receive an error message related to the remote direct write request; wherein the error message does not indicate whether an execution of the remote direct write request failed or is only temporarily delayed; respond to the error message by (a) preventing from sending one or more IO requests through the path, (b) preventing from sending at least one IO requests associated with the certain address range; and (c) requesting, using a management communication link, to force an execution of pending IO requests that are related to the path; and reuse the path following an indication that there are no pending IO requests that are related to the path.

The storage system may include a vast number (for example more than 500, 1000, 5000, 10000 compute nodes).

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
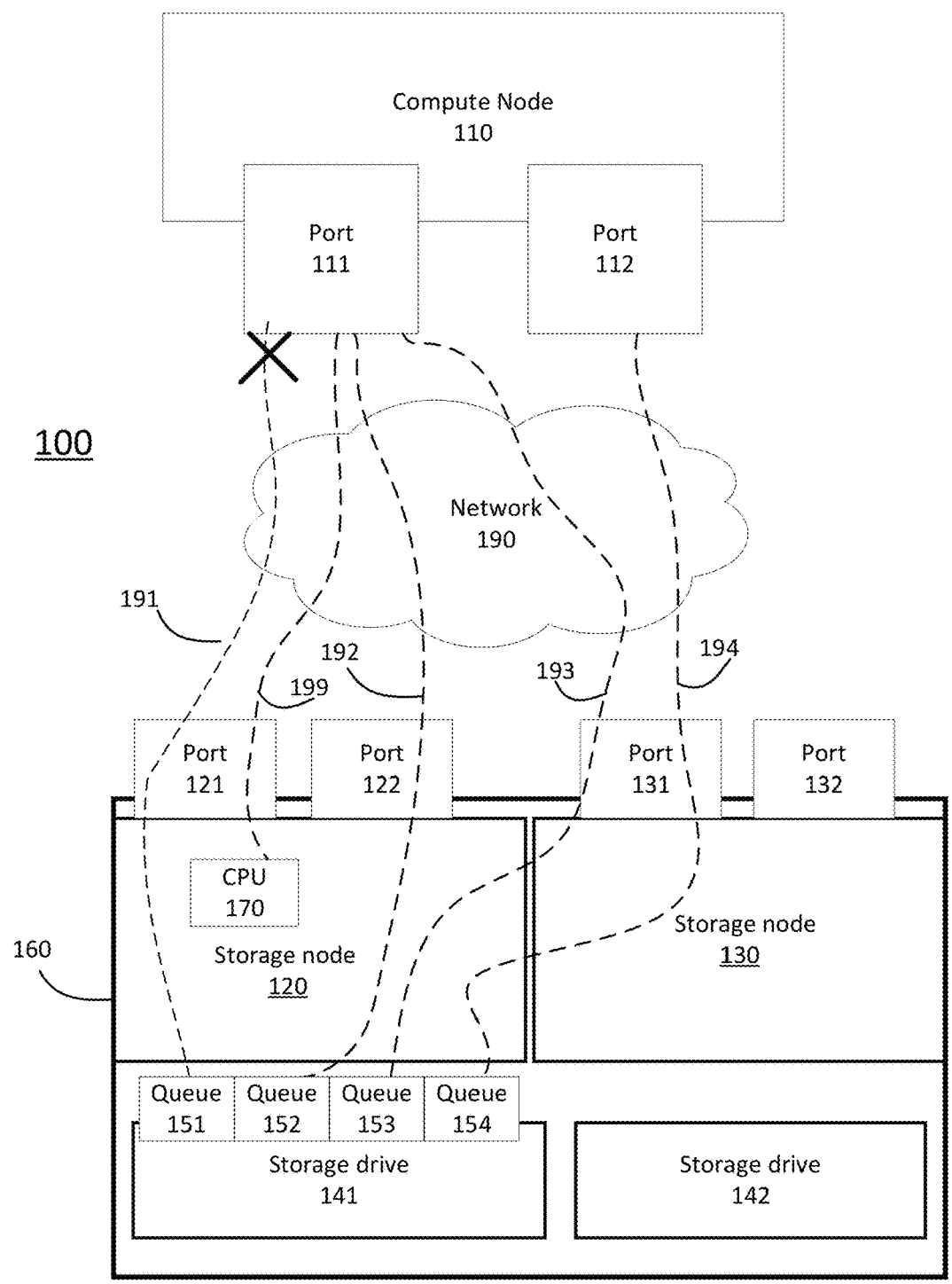
FIG. 1 is an example of a part of a storage system.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There are provided systems, methods and non-transitory computer readable medium for resolving erred IO (Input/Output) flows.

The storage system may include one or more compute nodes that execute most of the logic (storage processes and algorithms) of the storage system and may not include storage means for storing any data or metadata. The compute nodes are coupled to client computers for receiving IO commands for accessing files and other objects stored in the storage system, via different protocols implemented by the client devices or applications (e.g., TCP/IP, HTTP, FTP, various filesystem protocols, etc.). The compute nodes may be further configured to translate the clients' IO commands into NVMe over fabric commands towards the storage nodes and drives, and to map logical addresses within files and objects into physical addresses in the storage drives.

The storage system may include one or more storage nodes that execute low level logic for maintaining the health of the storage node and drives, and for receiving instructions from the compute node for controlling the operation of the storage drives or for obtaining status of the storage drives and nodes.

The distributed storage system of the present invention is composed of compute nodes that access, over a network, storage drives that may be controlled by storage nodes, where the storage nodes and storage drives may be housed in storage boxes. The compute nodes manage IO commands received from clients' computers using filesystem protocols (NFS, SMB, S3, etc.) or other IO protocols and send access requests towards the storage drives attached to the storage nodes. Communicating the access requests from the compute nodes to the storage drives may be implemented via NVMe (Non-Volatile Memory Express) protocol running over a fabric.

A compute node may receive an error related to a first IO request (remote direct write request) sent to a storage drive, indicating a failure to respond to the first IO request. When accessing storage drives over a network, some errors, e.g., timeout (IO) error, are not specific with regard to the error cause, and do not indicate whether the storage drive failed to execute the first IO request, or the fabric experienced a timeout, e.g., a network disconnection occurred, or another network problem that causes a delay in transmission of the first IO request. Especially—the error message does not indicate whether an execution of the remote direct write request failed or is only temporarily delayed.

The first IO request may be pending in a long queue of a storage drive, or in a congested communication port, or may be waiting at any other location along the transmission path, for a longer time than expected, and may be eventually executed, after or in parallel to the timeout notification.

In the above scenario, retransmitting the first IO request for which a non-specific error was reported, may result-in data corruption, as will be described herein.

Each compute node is coupled to a storage drive via multiple paths. When receiving an error notification that may be related to the path (first path) that was used by the compute node for sending the first IO request, another path is selected for the accessing entity that initiated the first IO request, where the new selected path is used for subsequent IO requests, including retransmissions of the first IO request that allegedly failed. The usage of the first path is avoided, until a background process is executed for checking the state of the first path and trying to revive the path, in a case it is in a faulty state.

The compute node may use the new selected path for retransmitting the first IO request. Given the different paths that were used for transmitting the first IO request and the retransmitted first IO request, the retransmitted first IO request may be executed before the first IO request, which may be still pending or stuck in any location along the communication path. After the compute node receives the success indication regarding the execution of the retransmitted first IO request, it acknowledges the client computer (or application) about the successful write.

Based on the acknowledge, the client computer may then send a second IO request directed to the same logical address range as of the first (and the retransmitted) IO request (or partially overlaps with this logical address range), with new data to overwrite the previous data sent by the first and retransmitted IO requests. The new data of the second IO request may be written while the first IO request is still pending. Eventually, the data of the first IO request is written, wrongly overwriting the same address range with superseded data, and causing corruption of the new data that was written by the second IO request.

According to embodiments of the invention, in order to avoid the data corruption, when the compute node receives a non-specific error in response to a write request, it avoids resending the potentially failed IO request, until it confirms that there are no pending IO requests that may be directed to the logical address range related to the potentially failed IO request.

In order to confirm that the pending IO requests are being terminated and cease to exist in any location along the path, the compute node first disables (e.g., disconnect) the first path that was used for sending the potentially failed IO request. This action will confirm prevention of sending IO requests over the path until it is determined that there are no more IO requests along the path.

The compute node then sends to the storage node, through a management communication link (a link that differs from the NVMe communication paths, or a path dedicated to management messages on top of the same transport layer), a request to force completion of queued IO requests related to the first path. The request to force completion identifies the path that used to communicate the first IO request, or at least a part of the elements along the path, e.g., a specific initiator, such as the compute node, and the compute node's port used to send the first IO request from the compute node. The storage node acknowledges the compute node when all the IOs related to the first path are handled.

Meanwhile, until the acknowledge from the storage node is received, the compute node may use other paths for sending IO requests to the storage node, e.g., by using another transmission port of the compute node, but avoid accessing the address ranges related to the first IO request. This may be done by, e.g., locking the blocks included in the avoided address range.

Only when the storage node acknowledges that the relevant one or more IO queues (related to the identified path or elements along a portion of the path) are empty, the compute node allows accesses to the address range related to the first IO, retransmit the first IO request, and enables (e.g., reconnect) the first path.

When the storage node receives the request to force completion of queued IO requests related to the first path, it disconnects the first path or any path related to the identified portion of the first path (e.g., compute node and the compute node port), so as to make sure that no new IOs arrives from the first path.

The storage node then waits for the relevant IO requests (traveling through the first path or through part thereof) to complete. After a certain time period of waiting for IOs to complete, the storage node forces termination of any IO that may be still pending, e.g., by reset the PCI controller, to make sure that there are no pending IOs, and all IOs are either finished or aborted.

The request to force completion may not be answered by the storage node, because the storage node may fail at the exact instant when the compute node received the non-specific error, and the failure may still not be detected by other processes of monitoring the health of the storage node. In this case, the request to force completion is retried, and if still not successful, it is determined that the storage node is faulty, and a failover process may be handled, by switching to another storage node of the storage box. After the failover is performed, IO requests related to the address range of the first IO request or retransmissions can be sent.

FIG. 1 illustrates a storage system 100 that includes a compute node 110 with two ports 111 and 112 that connects compute node 110 to a fabric, such as network 190, and a storage box 160 that hosts two storage nodes 120 and 130, each having two ports. Ports 121 and 122 connects storage node 120 to the fabric, and ports 131 and 132 connects storage node 130 to the fabric.

Storage box 160 is illustrated as hosting two storage drives 141 and 142, which may be PCI drives that are accessible from both storage nodes, and house multiple SSD devices or NVRAM devices.

It is noted that storage system 100 may include more than one compute node, more than one storage box, more than two storage drives in each storage box, more than two storage nodes in each storage box, and more communication ports.

FIG. 1 further illustrates multiple paths that connects the compute node to storage drive 141. Path 191 connects the compute node via compute node port 111 (NIC—Network Interface Controller), via the fabric, to storage node 120, via storage node port 121. Path 191 is associated with a queue 151 of multiple queues associated with storage drive 141. In a similar manner, path 192 connects the compute node via compute node port 111, via the fabric, to storage node 120, via storage node port 122. Path 192 is associated with a queue 152 of multiple queues of storage drive 141. Path 193 connects the compute node via compute node port 111, via the fabric, to storage node 130, via storage node port 131. Path 193 is associated with a queue 153 of multiple queues of storage drive 141. Path 194 connects the compute node via compute node port 112, via the fabric, to storage node 130, via storage node port 131. Path 194 is associated with a queue 154 of multiple queues of storage drive 141.

Compute node 110 may send an IO request via path 191 to storage drive 141, and may receive a non-specific error notification, e.g., timeout. Compute node 110 sends a request to force completion of queued IO requests related to path 191. The request may include at least the compute node identifier and the identity of compute node port 111 through which the IO request was sent and may further identify the storage drive 141. The request is sent via a management path, such as path 199 that connects the compute node to the processor 170 of storage node 120.

The compute node further disables path 191 as indicated by the X mark, and may also disable any further transmissions through port 111 through which the IO request was sent. Any subsequent IO requests may be sent via another path, and optionally, via a different port. For example, path 194 may be used for sending further IO requests. Only subsequent IO requests that are not directed to an address range that overlaps with addresses related to the potentially failed IO request—are transmitted. Subsequent IO requests that are directed to an address range that overlaps with addresses related to the potentially failed IO request—are put on hold, and particularly, no retry of the potentially failed IO request is attempted.

Storage node 120, upon receiving the request to force completion of queued IO requests related to path 191, disconnects path 191, or optionally—disconnects any path between storage node 120 and port 111 of compute node 110. Storage node 120 further monitors the progress of handling queue 151 associated with path 191 and storage drive 141, or alternatively, monitors any queue associated with compute node 110 and port 111, e.g., queues 191, 192 and 193. In case where the storage node does not have means for monitoring the queues, it just waits for an adequate period and then—reset the queue, by e.g., reset the PCI controller.

Storage node 120 sends a confirmation about the emptying of queued IO requests, via the management path 199.

Figure 2:
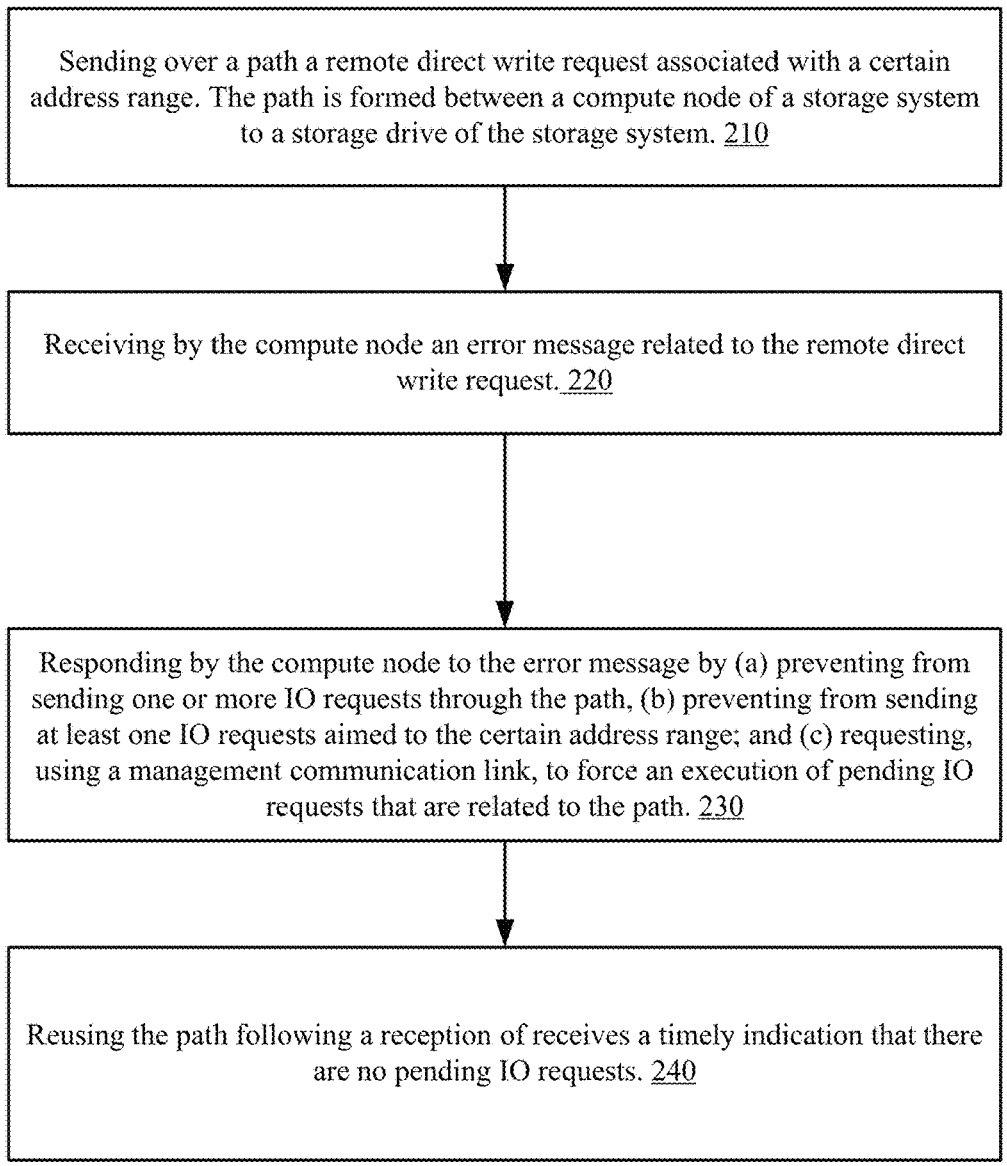
FIG. 2 is an example of a method.

FIG. 2 illustrates an example of method 200 for resolving an erred input/output (IO) flow.

Method 200 may start by step 210 of sending over a path a remote direct write request associated with a certain address range. The path is formed between a compute node of a storage system to a storage drive of the storage system. The certain address range may be a logical address range identified by an IO request received from a client computer that is coupled to the storage system. The IO request may be, for example, a request to access a certain file or other object, and the certain address range may be one or more offsets with the file or object. The client IO request is then translated by the compute node into the remote direct write request that is directed towards physical addresses within the storage drive.

The remote direct write request is termed "remote" because the path may include a compute node that is located remotely from the storage drive.

The remote direct write request is termed "direct" because it may be managed without involving a controller that is external to the storage drive and may control the storage drive. A nonlimiting example of such a controller may be a controller of a storage node (e.g., CPU 170) that is configured to control one or more aspects of the operation of the storage drive.

The compute node may include multiple compute node ports, the storage system may include a storage node that may include multiple storage node ports. The path may pass through one of the multiple compute node ports, a network, and one of the multiple storage node ports.

The remote direct write request may be a non-volatile memory express (NVMe) over fabric request.

Step 210 may be followed by step 220 of receiving by the compute node an error message related to the remote direct write request.

The error message does not indicate whether an execution of the remote direct write request failed or is only temporarily delayed.

If the compute node receives an indication of a successful execution of the remote direct write request—the compute node may continue sending IO requests over the path.

Step 220 may be followed by step 230 of responding by the compute node to the error message by (a) preventing from sending one or more IO requests through the path, (b) preventing from sending at least one IO requests associated with the certain address range; and (c) requesting, using a management communication link, to force an execution of pending IO requests that are related to the path. Following step 220, the compute node may use other paths to send remote direct write requests that are not associated with the certain address range. The remote direct write request is associated with the certain address range in the sense that the certain address range is addressed by a write request received from a client, where the write request is translated into a remote direct write request.

The management communication link may not belong to the path and may be accessible by a controller that may be external to the storage drive—for example a controller of the compute node from one end and the controller of the storage node from the other hand. The controller may be a controller that is bypassed by the remote direct write request. Bypassed means that the controller is not mandatory to the execution of the remote direct write request.

The responding to the error message, and particularly the request to force execution of pending IO requests related to the path, may be followed by receiving indications about the outcome of the request to force the execution. The indications may include an indication that the request was received, an indication regarding a status of execution of the pending IO requests, an indication that the execution of the pending IO requests has ended, an indication of an execution failure, and the like.

The compute node may expect that the execution of the pending IO requests will be completed within a certain time period and if not-may resend the request and/or determined that the lack of a timely response to one or more requests is indicative of a storage node failure—and initiate a failover process.

Assuming that the compute node receives a timely indication that there are no more pending IO requests—then step 230 may be followed by step 240 of reusing the path. In addition, the compute node enables sending further remote direct write requests associated with the certain address range, including retransmission of the remote direct write request.

While steps 210, 220, 230 and 240 are executed by the compute node—method 200 may include one or more steps that are executed by other parts of the storage system—for example by a storage drive and/or a storage node.

These additional steps may include at least one out of:
a. Responding to the request to force the execution of pending IO requests.
b. Successfully completing an execution of the pending IO requests.
c. Monitoring the execution of the pending IO requests.
d. Terminating any IO request of the pending IO request that is still pending at an end of a predefined period that starts at the requesting to force the execution of the pending IO requests.
e. Disconnecting the path.
f. Responding to the request to force the execution of pending IO requests by disconnecting the path and attempting to execute the pending IO requests.

Figure 3:
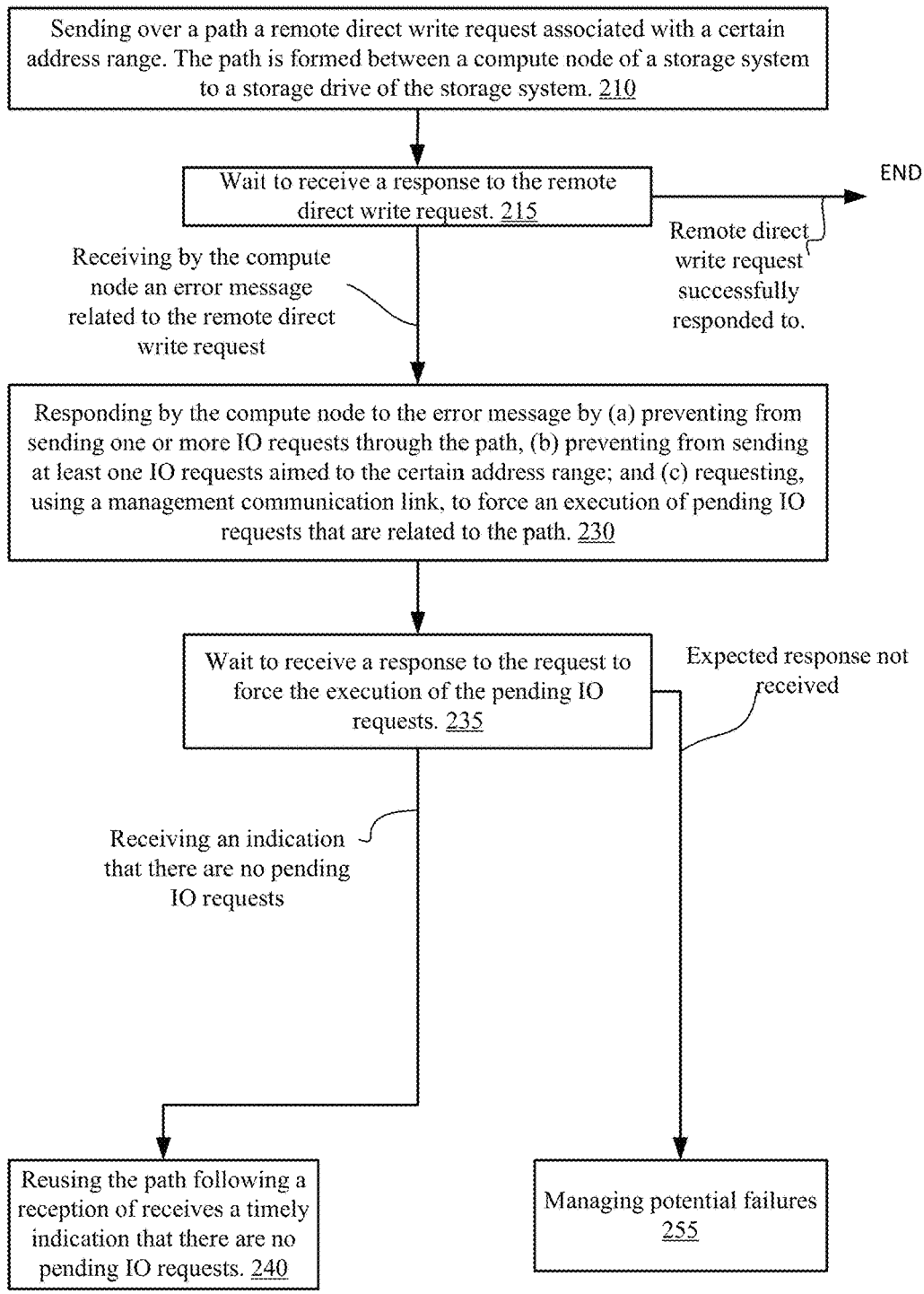
FIG. 3 is an example of a method.

FIG. 3 illustrates another example of a method 201.

Method 201 starts by step 210.

Step 210 is followed by step 215 of waiting to receive a response to the remote direct write request. If receiving an indication that the remote direct write request was successfully responded then method 215 ends. The compute node may send additional remote direct write request.

If receiving the error message then step 215 is followed by step 230.

Step 230 may be followed by step 234 of waiting to receive a response to the request to force the execution of the pending IO requests.

If receiving an indication that there are no pending IO requests then step 234 is followed by step 240.

If expected response is not received—for example no response was received during an expected time window—step 235 may be followed by step 255 managing potential failures. This may include resending the request to force the execution of the pending IO requests, initiating a failover process, and the like. After completing the failover process that may include transferring the responsibilities of the storage node to a redundant storage node, the compute node enables sending write requests directed to the certain address range, including retransmission of the remote direct write request.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for resolving an erred input/output (IO) flow, the method comprises:
    sending over a path a remote direct write request associated with a certain address range; wherein the path is formed between a compute node of a storage system to a storage drive of the storage system;
    receiving by the compute node an error message related to the remote direct write request; wherein the error message does not indicate whether an execution of the remote direct write request failed or is only temporarily delayed;
    responding by the compute node to the error message by (a) preventing from sending one or more IO requests through the path, (b) preventing from sending at least one IO requests associated with the certain address range; and (c) requesting, using a management communication link, to force an execution of pending IO requests that are related to the path; and
    reuse the path, by the compute node, following an indication that there are no pending IO requests that are related to the path.

2. The method according to claim 1 wherein the requesting is targeted to a controller that is bypassed by the remote direct write request.

3. The method according to claim 2 wherein the controller belongs to a storage node of the storage system.

4. The method according to claim 1 comprising successfully completing an execution of the pending IO requests.

5. The method according to claim 1 comprising terminating any IO request of the pending IO request that is still pending at an end of a predefined period that starts at the requesting to force the execution of the pending IO requests.

6. The method according to claim 1 comprising (a) failing to receive a response, within a certain time period by the compute node, to the request to force the execution of the pending IO requests; and (b) re-sending the request to force the execution of the pending IO requests.

7. The method according to claim 6 comprising performing a failover process when failing to receive a timely response to one or more request to force the execution of the pending IO requests.

8. The method according to claim 1 wherein the preventing from sending IO requests through the path comprises disconnecting the path.

9. The method according to claim 1 comprising responding to the request to force the execution of pending IO requests by disconnecting the path and attempting to execute the pending IO requests.

10. The method according to claim 1 wherein the compute node comprises multiple compute node ports, the storage system comprises a storage node that comprises multiple storage node ports; and wherein the path passes through one of the multiple compute node ports, a network, and one of the multiple storage node ports.

11. The method according to claim 1 wherein the remote direct write request is non-volatile memory express (NVMe) request.

12. The method according to claim 1 comprising retransmitting the remote direct write request following an indication that there are no pending IO requests that are related to the path.

13. At least one non-transitory computer readable medium that stores instructions for:
  sending over a path a remote direct write request associated with a certain address range; wherein the path is formed between a compute node of a storage system to a storage drive of the storage system;
  receiving by the compute node an error message related to the remote direct write request; wherein the error message does not indicate whether an execution of the remote direct write request failed or is only temporarily delayed;
  responding by the compute node to the error message by (a) preventing from sending one or more IO requests through the path, (b) preventing from sending at least one IO requests associated with the certain address range; and (c) requesting, using a management communication link, to force an execution of pending IO requests that are related to the path; and
  reuse the path, by the compute node, following an indication that there are no pending IO requests that are related to the path.

14. The at least one non-transitory computer readable medium according to claim 13 wherein the requesting is targeted to controller that is bypassed by the remote direct write request.

15. The at least one non-transitory computer readable medium according to claim 14 wherein the controller belongs to a storage node of the storage system.

16. The at least one non-transitory computer readable medium according to claim 13 that stores instructions for successfully completing an execution of the pending IO requests.

17. The at least one non-transitory computer readable medium according to claim 13 that stores instructions for terminating any IO request of the pending IO request that is still pending at an end of a predefined period that starts at the requesting to force the execution of the pending IO requests.

18. The at least one non-transitory computer readable medium according to claim 13 that stores instructions for (a) failing to receive a response, within a certain time period by the compute node, to the request to force the execution of the pending IO requests; and (b) re-sending the request to force the execution of the pending IO requests.

19. The at least one non-transitory computer readable medium according to claim 18 that stores instructions for performing a failover process when failing to receive a timely response to one or more request to force the execution of the pending IO requests.

20. The at least one non-transitory computer readable medium according to claim 13 wherein the preventing from sending IO requests through the path comprises disconnecting the path.

21. The at least one non-transitory computer readable medium according to claim 13 that stores instructions for responding to the request to force the execution of pending IO requests by disconnecting the path and attempting to execute the pending IO requests.

22. The at least one non-transitory computer readable medium according to claim 13 wherein the compute node comprises multiple compute node ports, the storage system comprises a storage node that comprises multiple storage node ports; and wherein the path passes through one of the multiple compute node ports, a network, and one of the multiple storage node ports.

23. The at least one non-transitory computer readable medium according to claim 13 wherein the remote direct write request is non-volatile memory express (NVMe) request.

24. The at least one non-transitory computer readable medium according to claim 13 that stores instructions for retransmitting the remote direct write request following an indication that there are no pending IO requests that are related to the path.

25. A storage system that comprises a compute node and a storage drive;
  wherein the compute node is configured to:
    send over a path a remote direct write request associated with a certain address range; wherein the path is formed between the compute node to the storage drive;
    receive an error message related to the remote direct write request; wherein the error message does not indicate whether an execution of the remote direct write request failed or is only temporarily delayed;
    respond to the error message by (a) preventing from sending one or more IO requests through the path, (b) preventing from sending at least one IO requests associated with the certain address range; and (c) requesting, using a management communication link, to force an execution of pending IO requests that are related to the path; and
    reuse the path following an indication that there are no pending IO requests that are related to the path.

* * * * *